(12) United States Patent
Young et al.

(10) Patent No.: US 9,327,319 B2
(45) Date of Patent: May 3, 2016

(54) METHOD OF SEPARATING MILL SCALE FROM A FLUID

(76) Inventors: Grant Young, Tulsa, OK (US); Ray Young, Glenpool, OK (US); Donald L. Dunning, Chapin, SC (US)

( * ) Notice: Subject to any disclaimer, the term of this patent is extended or adjusted under 35 U.S.C. 154(b) by 523 days.

(21) Appl. No.: 13/204,605

(22) Filed: Aug. 5, 2011

(65) Prior Publication Data

US 2012/0018354 A1    Jan. 26, 2012

Related U.S. Application Data

(63) Continuation-in-part of application No. 12/804,546, filed on Jul. 24, 2010, now abandoned.

(51) Int. Cl.
*B07B 1/46* (2006.01)
*B07B 1/55* (2006.01)
*B01D 33/03* (2006.01)

(52) U.S. Cl.
CPC .............. *B07B 1/55* (2013.01); *B01D 33/0376* (2013.01); *B07B 1/469* (2013.01); *B07B 1/4609* (2013.01)

(58) Field of Classification Search
CPC .......... B07B 1/30; B07B 1/4609; B07B 1/469
USPC .......................... 209/314, 315, 380, 397, 931
See application file for complete search history.

(56) References Cited

U.S. PATENT DOCUMENTS

| | | | | |
|---|---|---|---|---|
| 584,080 A | * | 6/1897 | Litter et al. | 209/42 |
| 2,970,693 A | * | 2/1961 | Morris | 209/265 |
| 3,255,885 A | * | 6/1966 | Burls | 209/314 |
| 3,666,095 A | * | 5/1972 | Krynock et al. | 209/254 |
| 3,865,629 A | * | 2/1975 | Dankoff et al. | 134/19 |
| 4,190,422 A | * | 2/1980 | Hitzrot, Jr. | 51/309 |
| 4,406,796 A | * | 9/1983 | Duval | 210/772 |
| 5,427,607 A | * | 6/1995 | Cristovici et al. | 241/20 |
| 2004/0099578 A1 | * | 5/2004 | Winkler et al. | 209/309 |
| 2012/0018355 A1 | * | 1/2012 | Young et al. | 209/311 |

* cited by examiner

*Primary Examiner* — Joseph C Rodriguez

(57) ABSTRACT

A process of separating a fluid and mill scale particles from mill slag can include:
1) Putting the mill slag onto a vibrating screen device which has a plurality of screen assemblies in a sequential configuration. Each screen assembly comprises a screen having a perforated center portion with elliptically shaped perforations with a span of no greater than 0.175 inches.
2) Vibrating each screen assembly to expedite separation of the mill scale particles and the fluid from the mill slag on each screen such that the fluid separated from the mill slag on each screen passes through the perforations and the mill scale particles convey along the screen.
3) Conveying the mill scale particles from a screen assembly that is sequentially before to a screen assembly that is sequentially after for further separating the fluid from the mill scale particles.

20 Claims, 8 Drawing Sheets

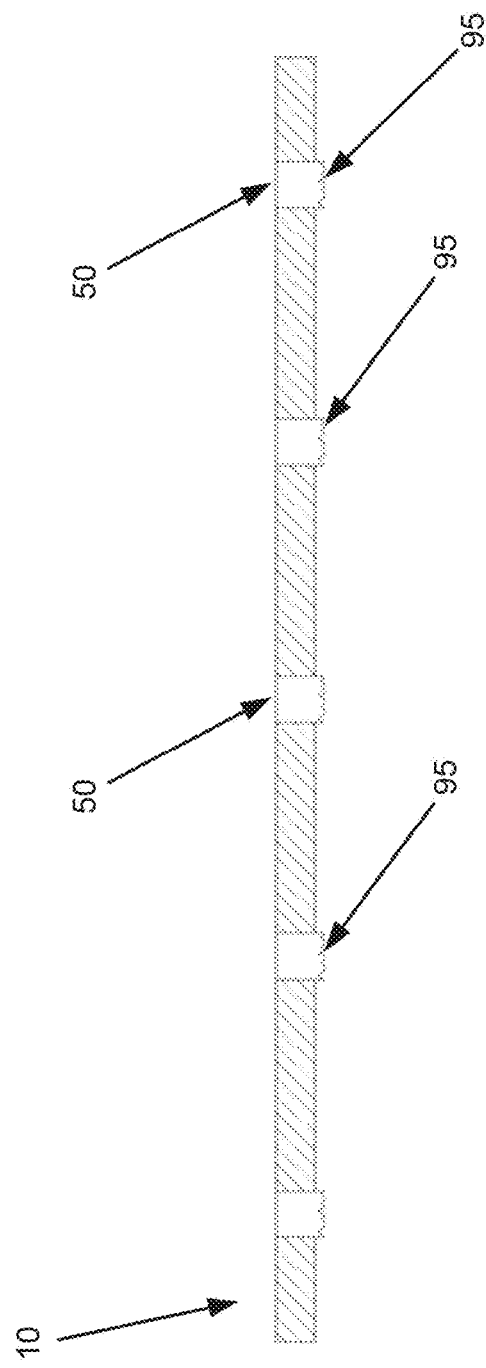
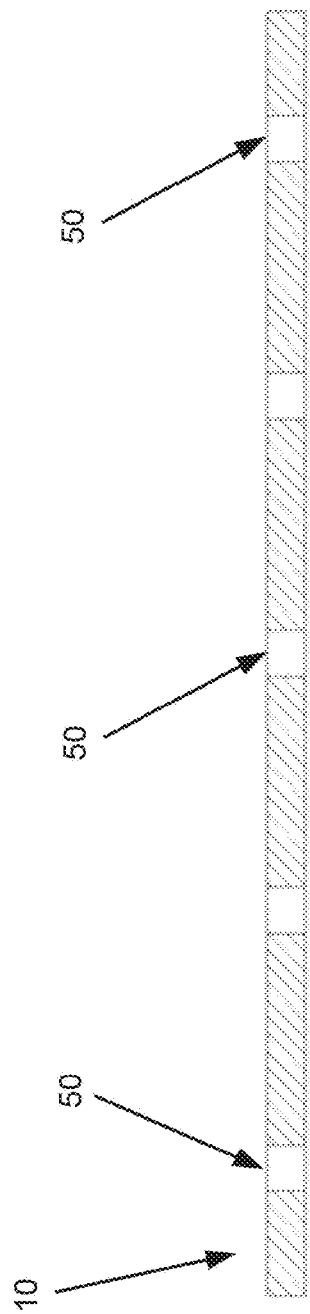

METHOD OF SEPARATING MILL SCALE FROM A FLUID

CROSS-REFERENCE TO RELATED APPLICATIONS

This application is a continuation-in-part of U.S. application Ser. No. 12/804,546 filed Jul. 24, 2010.

STATEMENT REGARDING FEDERALLY SPONSORED RESEARCH

Not Applicable

FIELD OF THE INVENTION

This invention relates to shakers and methods for separating solids from a fluid.

BACKGROUND OF THE INVENTION

Shakers or other vibrating devices can be used to separate solids from fluids. Some shakers have multiple screen assemblies having screens with a porous material for separating the solids from the fluid. The fluid passes through the porous material and the solids remain atop the screen to be conveyed off. The screen assemblies can have a stepped arrangement. Solids fall from the discharge end of each screen assembly to the feed end of the next screen assembly. With some solid materials, conveyance along the screens can be hindered because the particles get caught in the screen resulting in a pileup of solids and blinding of the screen surface. As used in this application, "blinding" refers to the condition when a screen has lost much of its filtering capability due to the pores within the screen being plugged to the point of substantially interfering with fluid flow through the screen. When significant blinding occurs, the separation process must often be temporarily stopped to clean the screen. If particles are not removed from the pores, then the life of the screen can be significantly shortened due to screen blinding.

One industrial process that requires effective separation of fluids from solids is in industrial metal manufacturing. In the process to produce rolled steel, an ingot of molten metal is poured through brass openings that are typically 5 or 6 ft long and about 6 inches wide in the narrow direction. These brass openings are cooled with water on their back side. A rectangular billet is formed and then it is cut to length and the rolling process begins. Water is sprayed on both sides of the surface of the billet as it is rolled narrower and narrower. As the steel is exposed to the air, mill scale develops on the surface of the steel. Mill scale is a metal oxide that forms due to the reaction of the oxygen in the air with the metal surface of the steel.

During the rolling process the mill scale must be removed from the steel. In most steel mills, high-pressure water is used to remove the mill scale. In some processes, the spray nozzles spray water at pressures up to 7,000 psi on the surface of the steel. Other rolling processes use water pressures about 4,000 psi. Lower pressure water sprays tend to leave more mill scale on the surface of the steel. The mill scale is blasted off the surface of the steel again and again as the sheet of steel is rolled to the correct thickness. The steel is then cut again to length and coiled while it is still red hot into a coil. The mixed stream comprising mill scale and water is often referred to as "mill slag".

Some processes can use fresh water in the high pressure spray. However, most processes use recirculated water recovered from the mill scale removal operation. Therefore, it is important that the mill remove as much particulate matter from the recirculated water. The presence of mill scale particles can shorten the life of the high pressure pumps and spray nozzles used due to erosive wear. In addition, mill scale particles in the recirculated water can contaminate the processed steel. If a spray nozzle becomes plugged it may result in the steel sheet being "out of spec.". The price for this sheet is often reduced.

Mill scale is steel oxide which is in the form of thin plate-type particles after it is blasted off the surface of the steel. Vibratory screen devices are not commonly used in operations involving mill scale removal because these plate-type particles tend to plug and blind a screen. One possible mechanism for this plugging is that the plate-type particles tend to get caught in the square or rectangular openings, much like fibrous materials but more so because of the shape of the particles. Changing the shape of the openings in the screen can reduce the propensity of the mill scale particles to hang up and plug the openings of screen; rounded openings such as circular or oval openings are examples of such openings.

To increase the operating life of the screen, fluid can be sprayed onto the screen to remove any mill scale particles that have built up on the surface of the screen or are trapped within the screen openings. The spray can be directed from underneath the screen in a reverse-cleaning process. The spray from underneath the screen further de-blinds the screen of the small amount of solids which are a similar size and shape as the hole openings. In some embodiments the spray can be directed from above the screen to remove the particulate from the surface and aid in its conveyance to a sequential screen assembly.

There is a need for a process to separate mill scale from fluid that provides consistent and effective conveyance of the mill scale during the separation and for a screen that can be used to improve this process.

The instant invention, with its multiple embodiments as disclosed within this application, provides a process and a screen that fills this need. The art referred to and/or described within this application is not intended to constitute an admission that any patent, publication or other information referred to herein is "prior art" with respect to this invention. In addition, this section should not be construed to mean that a thorough search has been made or that no other pertinent information as defined in 37 C.F.R. §1.56(a) exists.

All US patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well, only for the purposes of complying with 37 C.F.R. 1.72. The abstract is not intended to be used for interpreting the scope of the claims.

BRIEF SUMMARY OF THE INVENTION

In at least one embodiment of the invention, a process of separating a fluid and mill scale can be done by:
1) delivering the fluid containing mill scale onto a screen assembly in a vibrating screen device where the screen assembly comprises a screen having a porous center portion and pores of no greater than 0.175 inches, 2) vibrating the screen assembly to improve separation of the mill scale and the fluid such that the fluid passes through the pores and the mill scale conveys along the screen.

In at least one embodiment of the invention, the pores are perforations. In some embodiments the perforations have a span of no greater than 1/16 inches. In at least one embodiment of the invention, the screen is constructed of a metal, a plastic, a ceramic, or any combination of these.

In at least one embodiment of the invention, the screen is coated with a coating material and the perforations are formed through the coating material. In at least one embodiment of the invention, the coating is a paint, plastic, epoxy, or any combination thereof.

In at least one embodiment of the invention multiple screen assemblies are used with the screen assemblies being sequentially arranged. As used in this application screen assemblies that are "sequential" or that have a "sequential configuration" convey material from one screen assembly to the next screen assembly in the sequence and/or allow material (solid or fluid) to pass through the pores/perforations of one screen assembly and/or over the edges of one screen assembly to the next screen assembly in sequence. So, a sequential configuration includes but is not limited to 1) screen assemblies positioned one above another, 2) screen assemblies adjacent one another without a substantial step down between them such that material conveys from one screen assembly to the next (screen assemblies can actually butt up against one another), and 3) screen assemblies configured in a stepped down configuration such that the conveyed material from one screen assembly falls off the edge of the one screen assembly onto the next screen assembly in the sequence.

Also, a screen assembly that is "sequentially after" is a screen assembly in the sequence that receives material (solid or fluid) from another screen assembly in the sequence. A screen assembly that is "sequentially before" is a screen assembly in the sequence that transfers material (solid or fluid) to another screen assembly in the sequence. Obviously if there are more than two screen assemblies in the sequential configuration at least one will be both "sequentially after" another screen assembly and "sequentially before" another screen assembly.

In at least one embodiment of the invention the screen assemblies are sprayed from below or above to help clear solid material that may be stuck on or in the pores/perforations of the screens in the screen assemblies.

In at least one embodiment of the invention, the fluid is a water based fluid, an oil based fluid, a gelatinous based fluid, a plasma based fluid, or any combination thereof.

The patent application titled "Vibrating Screen Device" and having patent application Ser. No. 12/658,686 is incorporated by reference in its entirety. The vibratory screen device of this previously filed patent application can be used in many embodiments disclosed herein.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawing.

FIGS. 7a and 7b are cross-section side views of perforated plates.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated. Unless otherwise stated, the term "oval" includes an oval, ellipse, circle, or any other shape without corners. Additionally, within this application the term "proximal" end of the shaker or screen assembly is the end in which the material to be separated is introduced; the "distal" end of the shaker or screen assembly is the end toward which the separated solids are conveyed. For purposes of this application, the term "perforation" refers to a hole formed by removing material from a sheet or plate or moving material on the plate to form a hole; a "perforated plate" is a sheet or plate having holes formed by removal of material from the sheet or plate or by moving material on the sheet or plate. Though there can be other methods of creating these perforations some methods include by punching holes out with a press or with fluid or gas pressure; grinding holes; cutting holes through by use of a saw, laser, liquid, or gas; chemically creating the holes, or any combination of these. As used in this application, mill scale is metal oxide compound formed from the reaction of oxygen with a metal surface that is removed from the surface of the metal during metal manufacturing processes. Coarser mill scale is in the form of platelets. Finer mill scale is often more square or blockish in shape. Finally, as used in this application when describing or stating that mill scale and fluid are separated, the separated mill scale can still have fluid mixed with it, however it has less fluid than the original wet stream.

Figure 1:
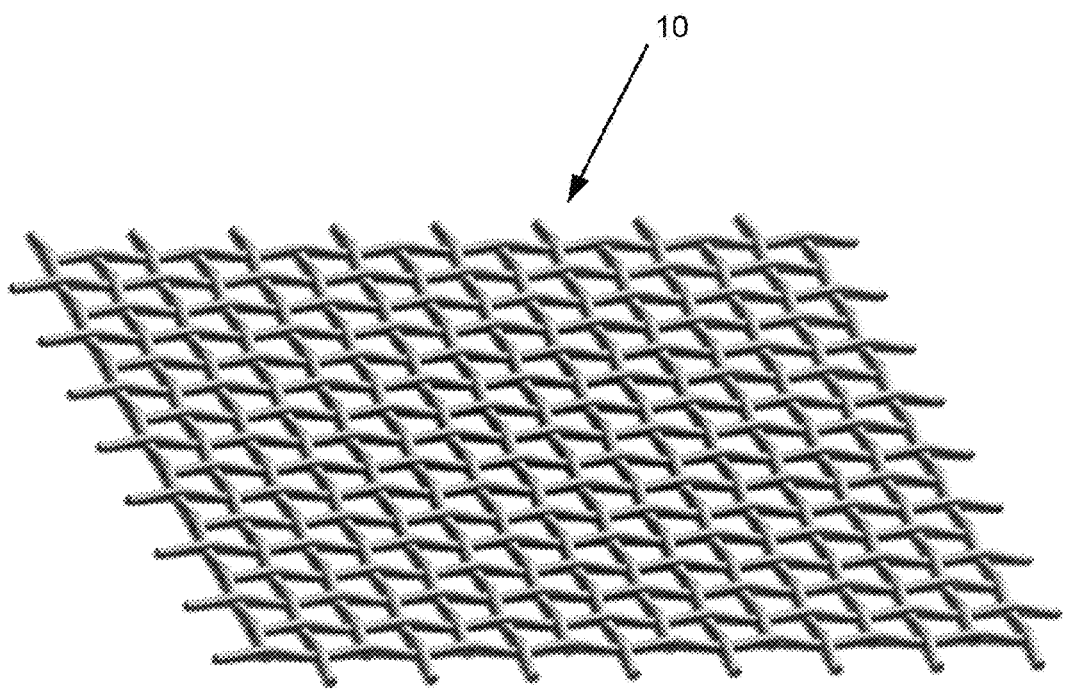
FIG. 1 is a perspective view of a portion of wire square mesh that can be used in a separating screen
Figure 2:
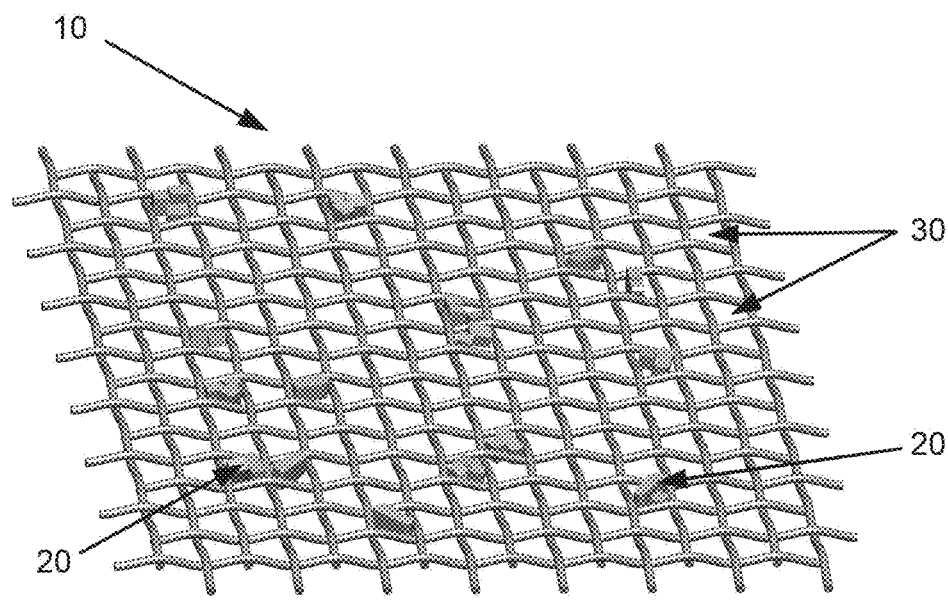
FIG. 2 is a perspective view of a portion of wire square mesh that has mill scale caught in the wires.
Figure 2A:
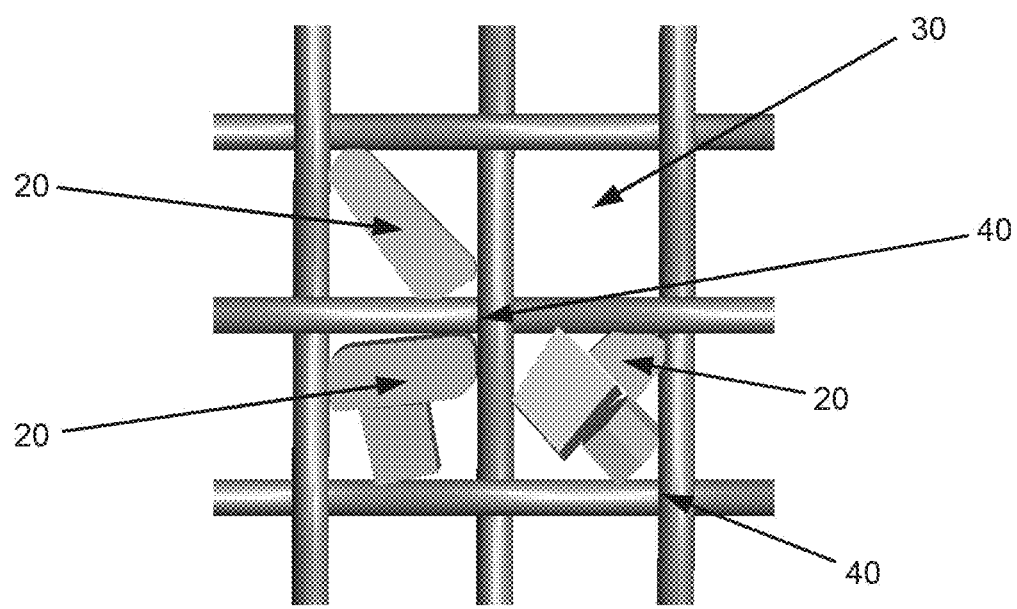
FIG. 2a is an enlarged top view of a portion of wire square mesh that has mill scale caught in the wires.

In FIG. 1 a Prior Art portion of woven wire square mesh screening 10 is shown. The term woven here is used to describe the product rather than the method of construction even if the actual method for constructing the screen 10 is weaving. There are many weaves, all woven screens consist of one form or another of over under wiring. The result is a screen that has thickness and is rough on the upper surface as the wires go over and under each other. This is particularly true as screens become coarser, normally with larger wire diameters. This material is commonly used in separating solids from fluids in wetted material. When the material to have the fluid and solid matter is a plate-type particle such as mill scale, blinding of the screen 10 with this mill scale material can occur. This is partly caused by the roughness of the screen. The flat particles turn vertical and are caught in the openings. As shown in FIG. 2 mill scale particles 20, 20' can get stuck in the pore openings 30 by wedging themselves across the openings and in the corners 40 of pores where the wires cross. These scale particles can also get caught vertically within the pore which can then cause other articles to get stuck on the caught scale particle. Smaller mill scale particles 20 may get stuck in a corner 40 of the opening and partially block the opening 30. Larger mill scale 20' particles may also get caught but are large enough to substantially block the entire opening 30. These particles 20, 20' can turn vertically or remain substantially horizontal with the surface of the screen.

These screens 10 when used with streams containing mill scale can have mill scale particles materials get caught in these corners 40 or over these openings; this can begin the screen blinding process as more and more mill scale particles hang up in the screen 10 as additional particles are caught within the opening 30 and then on those captured mill scale particles 20 themselves. This collection of mill scale particles 20" can block one or more openings 30. As this continues, more of the screen opening 30 can become plugged/blinded. The vibration of these steel particles can also grind on the screen, and can ultimately severely damage the screen. Cleaning a screen 10 which was blinded with mill scale can often require scrubbing with a brush which can be labor intensive and may shorten the life of a screen 10.

Figure 3:
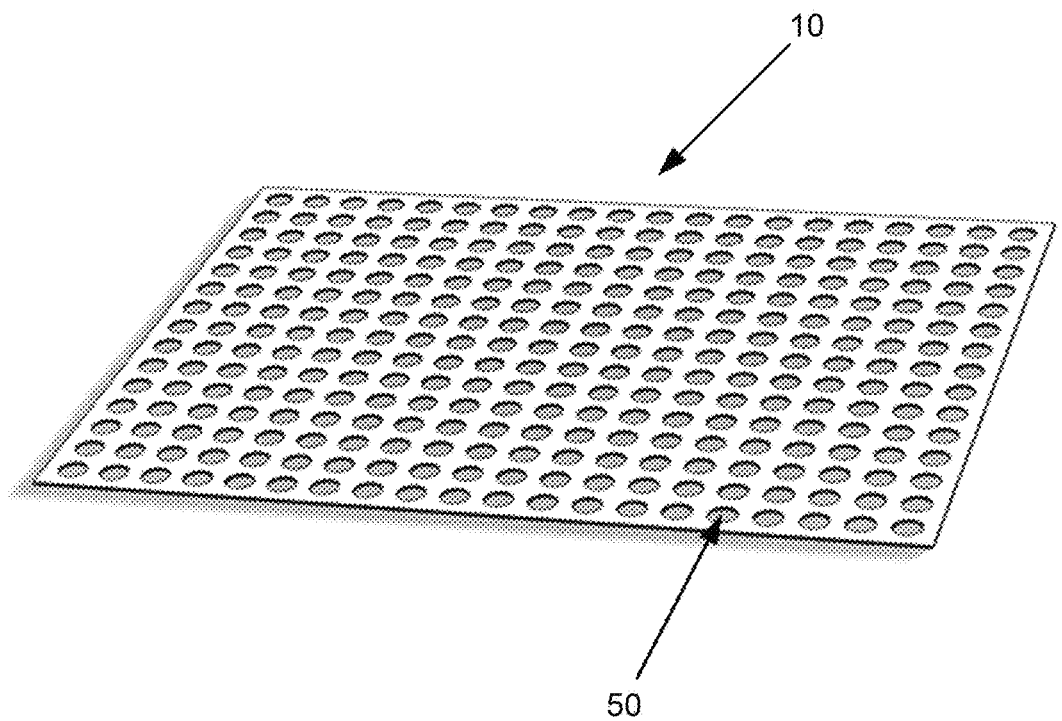
FIG. 3 is a perspective view of a portion of a perforated screen having oval perforations.
Figure 3A:
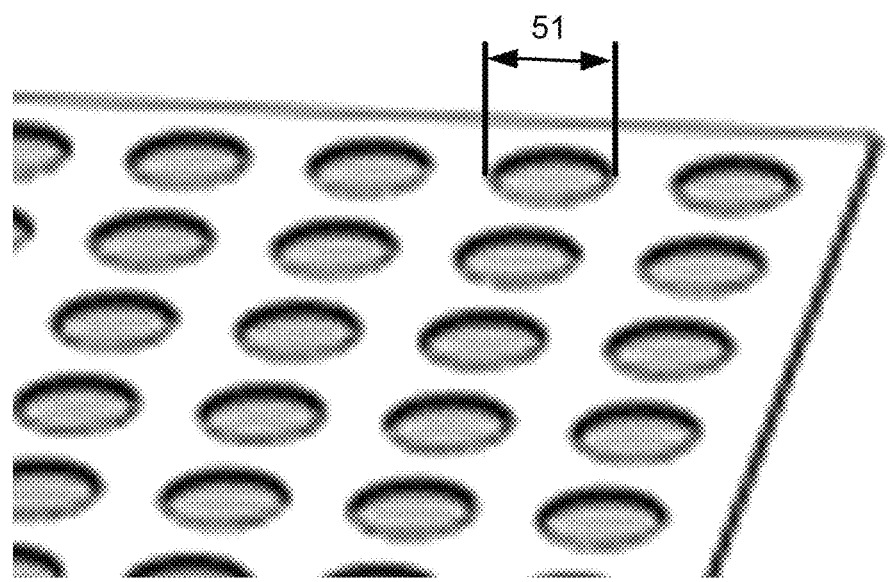
FIG. 3a is a perspective view of a portion of a perforated screen illustrating the span of a perforation.

The perforations of the inventive plate and process greatly reduce the frequency at which mill scale particles get caught in the openings of a screen. There are several reasons this occurs: 1) perforated plates present a flat surface to the solids being separated. Larger mill scale is typically a flat platy particle which will lay flat on the surface of this flat plate. They are then ushered off the porous surface without ever really trying to go through the holes of the perforated plate. 2) there are no corners to get caught in. As shown in FIG. 3 the perforated screen 10 has oval shaped perforations 50 with a span 51 (illustrated in the enlarged screen portion in FIG. 3a). The span 51 extends from one end of a perforation to the other end across the greatest length dimension of the perforation 50. The perforated screen 10 can be constructed with perforations having a span of less than 0.175 inch. In some embodiments the span is 1/32 inch or smaller. These small perforations can allow fluid to pass through while they can also ameliorate the issue of particles blinding the screen.

Figure 4:
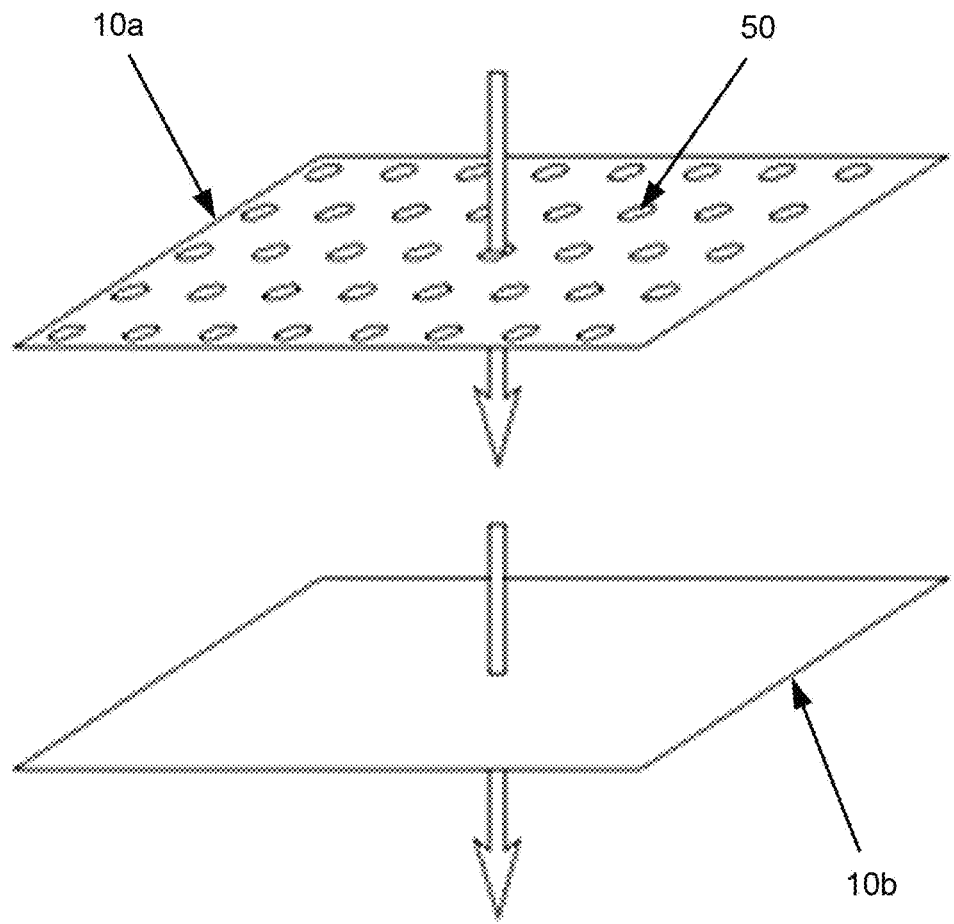
FIG. 4 is a schematic perspective view of two screens with the upper screen having larger sized pores than the lower screen.

In some embodiments, as schematically shown in FIG. 4, separating the mill scale stream into mill scale particles and fluid can be performed using at least one perforated plate/screen 10a and at least one non-perforated plate/screen 10b (e.g. standard wire mesh screen). When placed on a perforated plate 10a, the mill scale stream (wet or not) can be vibrated by vibration of the plate 10a such that the larger mill scale particles remain on the upper surface of the perforated plate 10a until it is conveyed off of the perforated plate. Fine material and fluid can pass through perforations 50 of the perforated plate 10a and onto non-perforated plate 10b. The particles passing through the perforated plate are blocky and not plate-like in shape. As a result, blinding of the screen is not as likely because of the shape of the mill scale particles. The screens 10a and 10b within a vibrating shaker or two or more successive shakers can separate the large mill scale particles from the fine mill scale particles by collecting the larger particles conveyed by perforated plate/screen 10a and collecting the finer material as it is conveyed by non-perforated plate/screen 10b.

Figure 5:
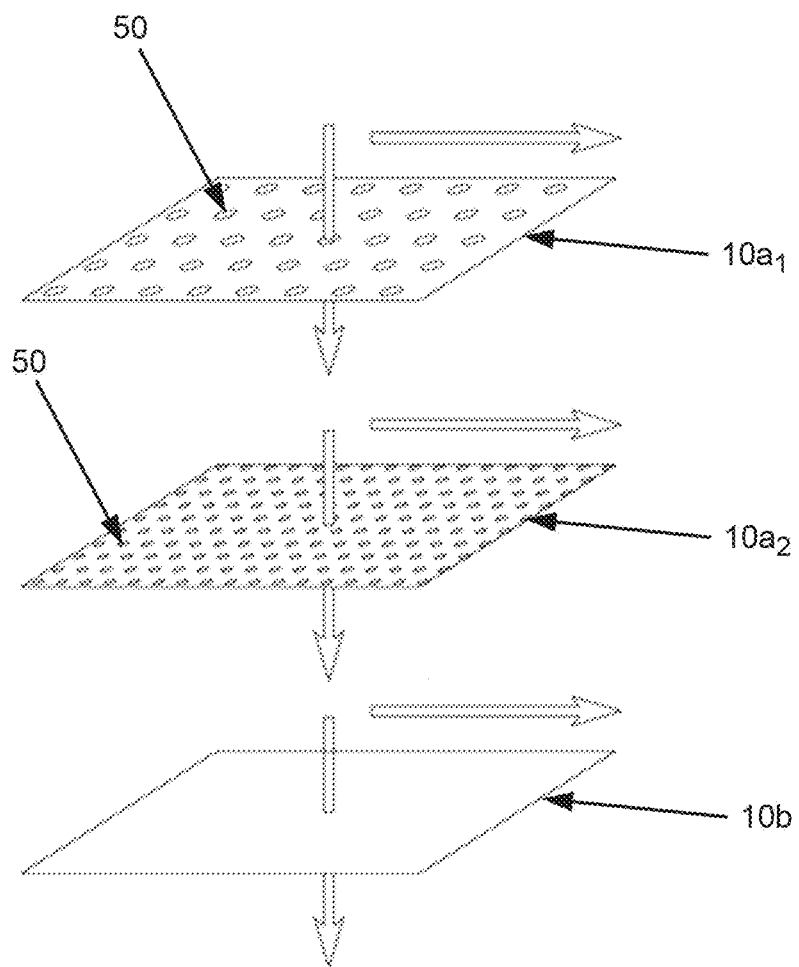
FIG. 5 is a schematic perspective view of three screens with the uppermost screen having larger sized pores than the two lower screens.

In FIG. 5 multiple perforated plates $10a_1$ and $10a_2$ with non-perforated plate 10b are shown. Here, perforated plate $10a_1$ has larger perforations 50 than does perforated plate $10a_2$. Mill scale particles disposed on perforated plate $10a_1$ can allow fluid, fine material and some smaller particles through the larger perforations 50 of perforated plate $10a_1$, but without the same blinding issue as the perforations have a diminished rate in particles being caught within the perforations 50.

Plate $10a_2$ can then allow the fluid and fine material to pass through its perforations 50 and transfer onto non-perforated plate 10b. On the non-perforated plate 10b there is further separation as the fines do not pass through the holes of the non-perforated plate while the fluid does. The vibratory action on each of the screens 10 of FIG. 5 can convey the separated material into separate areas for collection.

Figure 6:
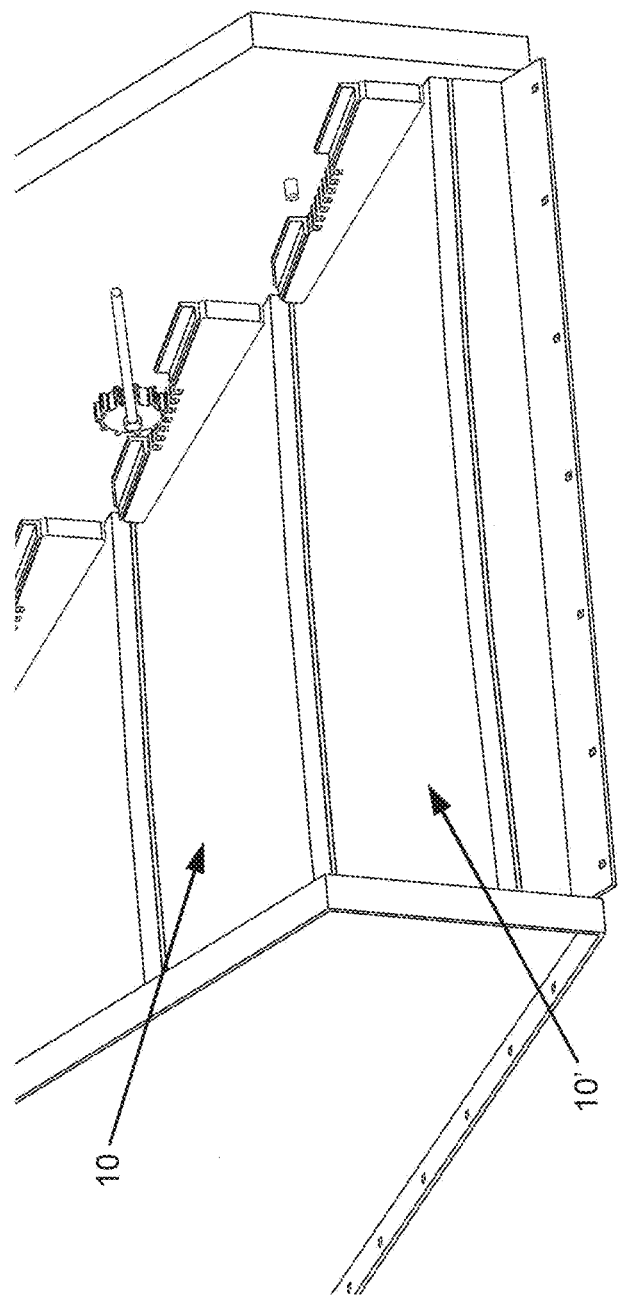
FIG. 6 is a perspective view of a shaker having screen assemblies in a stepped down configuration

While the screen assemblies/plates 10 as illustrated in FIGS. 4 and 5 show the screen assemblies/plates disposed directly above/beneath the other screen/plate(s) 10, in some embodiments the screens 10 are arranged in a sequential and/or stepped configuration as shown in FIG. 6. In FIG. 6 the screen assemblies/plates 10 are disposed within a vibrating screen device 70. Here, the mill scale stream can have fluid and/or fine materials pass through each screen of the screen assembly. The mill scale particles are conveyed along each screen assembly/plate 10 and transfer to the next lower screen assembly/plate 10 until it transfers off the vibrating screen device 70. In some embodiments the perforated plates, instead of being stepped down are simply butted up against each other such that the material is conveyed from one screen assembly surface to an adjacent screen assembly surface. In some embodiments the vibrating screen device 70 has a vibratory motion that is oval shaped. In some embodiments the vibrating screen device 70 has a vibratory motion that is elliptical. In some embodiments the vibrating screen device 70 has a vibratory motion of about 1800 cycles per minute. In some embodiments the vibrating motion is linear. In some embodiments a vibratory motion of between about 500-1200 cycles per minute can be used. In some embodiments a vibratory motion of between about 1200-1800 cycles per minute can be used. In other embodiments a vibratory motion of between about 1800-3600 cycles per minute can be used. Vibratory motion of less than 500 or more than 3600 cycles per minute can also be used in some embodiments.

In some embodiments, the mill scale particles can be conveyed along each screen in paths that are substantially straight. In some embodiments the paths are substantially parallel to one another. Thus, regardless of where each portion of mill scale material is put or transferred onto a particular screen, each portion can move in the substantially same direction. It is understood that solids conveyance requires that the solids leave the surface of the perforated plate, resulting in the solids falling back at a different location on the perforated plate to be carried forward by the perforated plate. In fact the screen vibration can result in oval shaped motions of the mill scale material when the material rises from the screen. Within this application, such movement is consistent with the terms "substantially straight" and "substantially parallel" as the material is moving generally in a straight and/or parallel path when viewed looking straight down (top view) at the screen surface. When viewing the conveyance from a side view oval shaped movement (sometimes specifically elliptical motion) may be observed. It should be noted that there will be instances in which even from the top view the material can on occasion move in a non-linear and/or non-straight manner, but when the motion is described as substantially straight, the movement is generally straight. Thus, in some embodiments the mill scale material is put on the proximal end of a screen and conveyed off the distal end of the screen.

In some embodiments, the movement of the material is in a zig-zag path from the proximal end to the distal end. In some embodiments movement of the mill scale material follows a single path or multiple curved paths.

In some embodiments the perforated screen 10 has a bottom side wherein portions of the screen disposed about or adjacent to each perforation extend from the screen creating a crown 95 having sharp edges as shown in the cross-sectional side view of FIG. 7a. The crown 95 can basically extend the width of the perforated hole 50 so that mill scale has a larger area within the perforated hoe to get wedged/caught as they begin to pass through the perforations 50 of the perforated screen 10. By removing the crowns 95, the mill scale is less likely to be caught. Rounded edges on the underside of the screen would also be an improvement. These rounded edges would not tend to catch the mill scale. One method of fabricating an uncrowned perforated plate, which is a perforated plate with either rounded or absent crowns 95, is through scotch brighting the surface. Also, by vibrating an abrasive slurry with abrasives that are small and round but too large to pass through the perforation 50 or get stuck in the perforation 50, the crown 95 can be rounded or removed (as shown in FIG. 7b).

In some embodiments, spray nozzles can be used above the screen to break up clumps of material to be separated. This can also be desirable to help keep the product moving over the surface of the screen 10.

In some embodiments, spray nozzles can be used under the screen 10 to clear any mill scale material that might be in the holes of the screen 10. For example, one or more nozzles could be directed towards the vibratory screen shown in FIG. 7 above one or more screens assemblies and/or positioned below one or more screen assemblies. The nozzle(s) could be placed on the wall of the vibratory screen device below and/or under the screen assembly. Additionally, one or more nozzles could be positioned on a track set above and/or below the screen assembly. This arrangement can allow the nozzle(s) to be moved on the track to be positioned and/or repositioned. The track can run from a proximal side of the screen assemblies to a distal side. The track can also run across the width of the screen assembly. It should be noted that a vibratory screen device having a single screen assembly can also have nozzles placed as described above. An underside spray wash can dislodge mill scale materials which may be sitting in the opening, back onto the upper side of the perforated plate. Such a spray wash can also clear grease and other contaminates which may coat the opening.

In some embodiments the spray nozzles are aligned such that the center axis of the nozzle is perpendicular to the surface of the screen. In some embodiments the spray nozzles are aligned such that the center axis of the nozzle is non-perpendicular to the surface of the screen. In some embodiments, a line from the center axis of the nozzle forms an angle with the screen surface of less than 80 degrees, less than 60 degrees, or less than 40 degrees. In other embodiments the angle can be between 20 degrees and 80 degrees. The angle can be larger than 30 degrees, larger than 50 degrees, or larger than 70 degrees.

In some embodiments mill scale and fluid materials can be separated using a vibratory shaker having perforated plates with perforations no larger than 1/16 inch.

Figure 8:
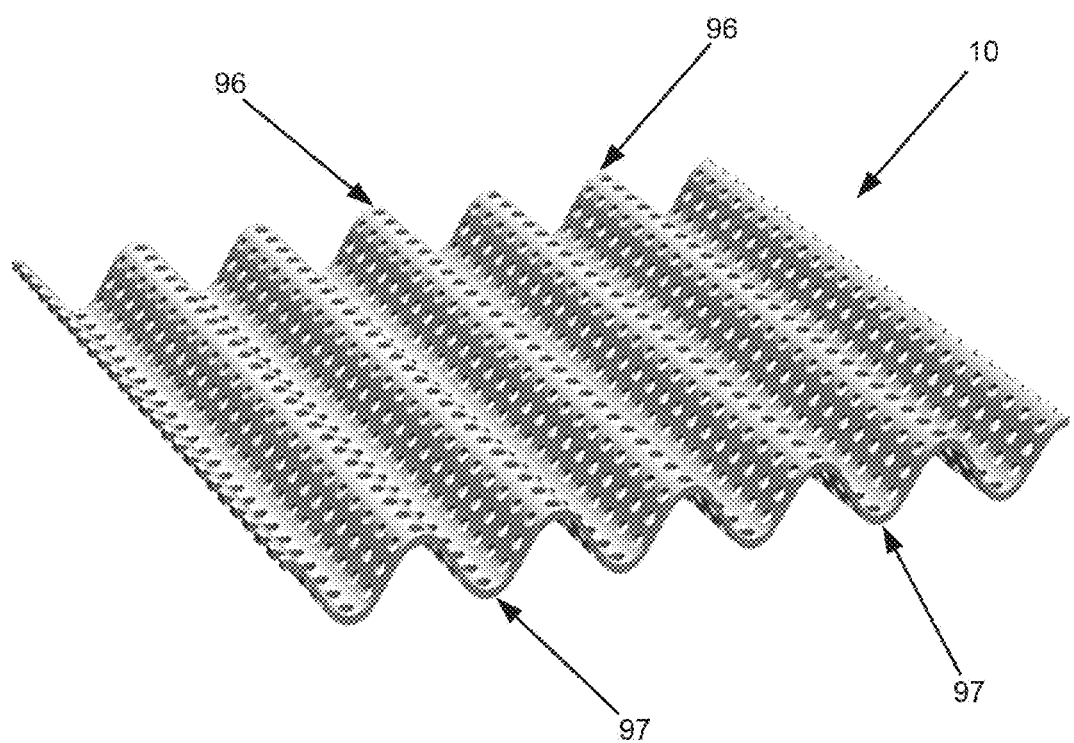
FIG. 8 is a perspective view of a non-flat perforated plate.

As shown in FIG. 8, the perforated plate does not need to be flat. There can be a single or multiple raised portion(s). In fact the plate/screen 10 can have a corrugated or sinusoidal shape with peaks 96 and valleys 97. The screen assembly 10 can also include a mixture of flat and non-flat portions; examples of the flat portions are shown in FIGS. 1-7 and an example of the non-flat portions is shown in FIG. 8.

For the purposes of this disclosure, like reference numerals in the figures shall refer to like features unless otherwise indicated.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A process for separating components of a mixed stream comprising mill scale particles and a fluid by:
    delivering the mixed stream to plurality of screen assemblies in a sequential configuration, each of the plurality of screen assemblies comprising a screen having a perforated center portion with oval shaped perforations, the perforations having a span of no greater than 0.175 inches,
    vibrating each screen assembly to expedite separation of the mill scale particles and the fluid from the mixed stream on each screen such that the fluid separated from the mill scale particles on each screen passes through the perforations and the mill scale particles convey along the screen,
    conveying the mill scale particles through screen vibration from a screen assembly that is sequentially before to a screen assembly that is sequentially after for further separating the fluid from the mill scale particle.

2. The process of claim 1 wherein the fluid comprises water.

3. The process of claim 1 wherein at least one of the screens has perforations having a span of no greater than 1/16 inches.

4. The process of claim 1 wherein the sequential configuration is a stepped down configuration.

5. The process of claim 1 wherein at least one screen assembly comprises a woven screen which has been coated with a coating material selected from the group consisting of paint, plastics, epoxies, and any combination thereof and where the perforations are formed through the coating material.

6. The process of claim 1 including spraying at least one of the screens to dislodge any material caught in the pores, the spraying being from a location selected from the group consisting of above the screen, below the screen, and above and below the screen.

7. The process of claim 1 wherein the sequential configuration includes screen assemblies that are adjacent to one another such that one end of a sequentially after screen assembly is butted against a sequentially before screen assembly.

8. A process of separating a fluid and mill scale particles from mill slag by:
   delivering the mill slag onto a screen assembly disposed in a vibratory device, the screen assembly comprising a screen having a perforated center portion and having perforations of no greater than 0.175 inches,
   vibrating the screen assembly to expedite separation of the mill scale particles and the fluid from the mill slag such that the fluid passes through the perforations and the mill scale particles convey through screen vibration along the screen in a substantially straight line.

9. The process of claim 8 wherein the screen has perforations having a span of no greater than 1/16 inches.

10. The process of claim 8 wherein the fluid comprises water.

11. The process of claim 8 wherein the screen is constructed of materials selected from the group consisting of metals, plastics, ceramics, and any combination thereof.

12. The process of claim 8 wherein the screen is coated with a coating material through which perforations are formed, the coating material selected from the group consisting of paint, plastics, epoxies, and any combination thereof.

13. The process of claim 8 wherein the vibrating screen device includes a plurality of screen assemblies.

14. The process of claim 8 wherein the plurality of screen assemblies are arranged in a stepped down configuration such that the mill scale particles conveyed off any upper screen are passed to a lower screen.

15. The process of claim 8 wherein the plurality of screen assemblies are arranged adjacent to one another such that one end of a sequentially after screen assembly is butted against a sequentially before screen assembly.

16. The process of claim 8 wherein the fluid is selected from the group consisting of water based fluid, oil based fluid, gelatinous based fluid, plasma based fluid, and any combination thereof.

17. The process of claim 8 wherein the vibrating screen device includes at least one perforated screen and at least one non-perforated screen.

18. The process of claim 8 wherein the mill scale particles are conveyed along the screen in paths that are substantially parallel.

19. The process of claim 8 wherein the screen is corrugated.

20. The process of claim 8 including spraying a fluid on the screen for improving conveyance of the mill scale particles, at least one spray nozzle being disposed on the vibratory screen device and directed toward the screen, the at least one spray nozzle being disposed in a location selected from the groups consisting of above the screen, below the screen, and above and below the screen.

* * * * *